United States Patent Office 3,119,007
Patented Jan. 21, 1964

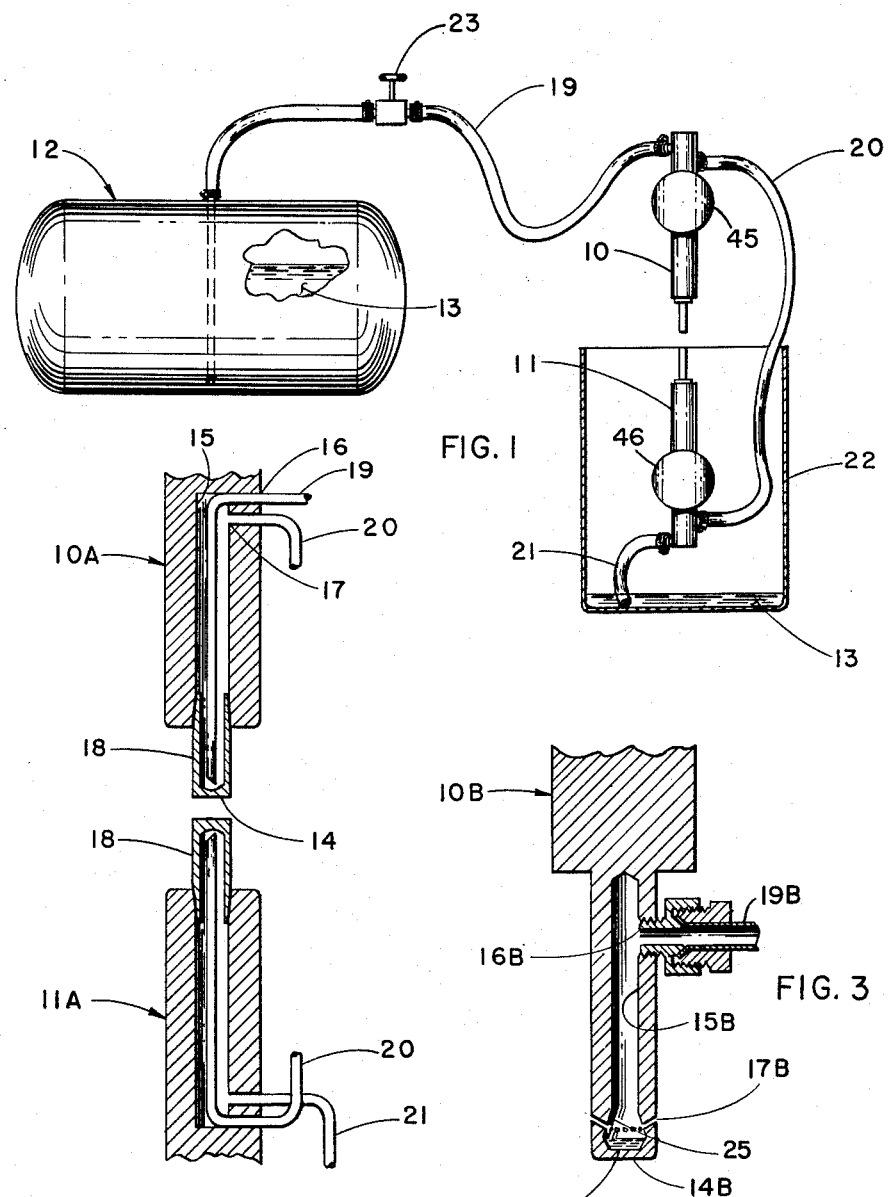

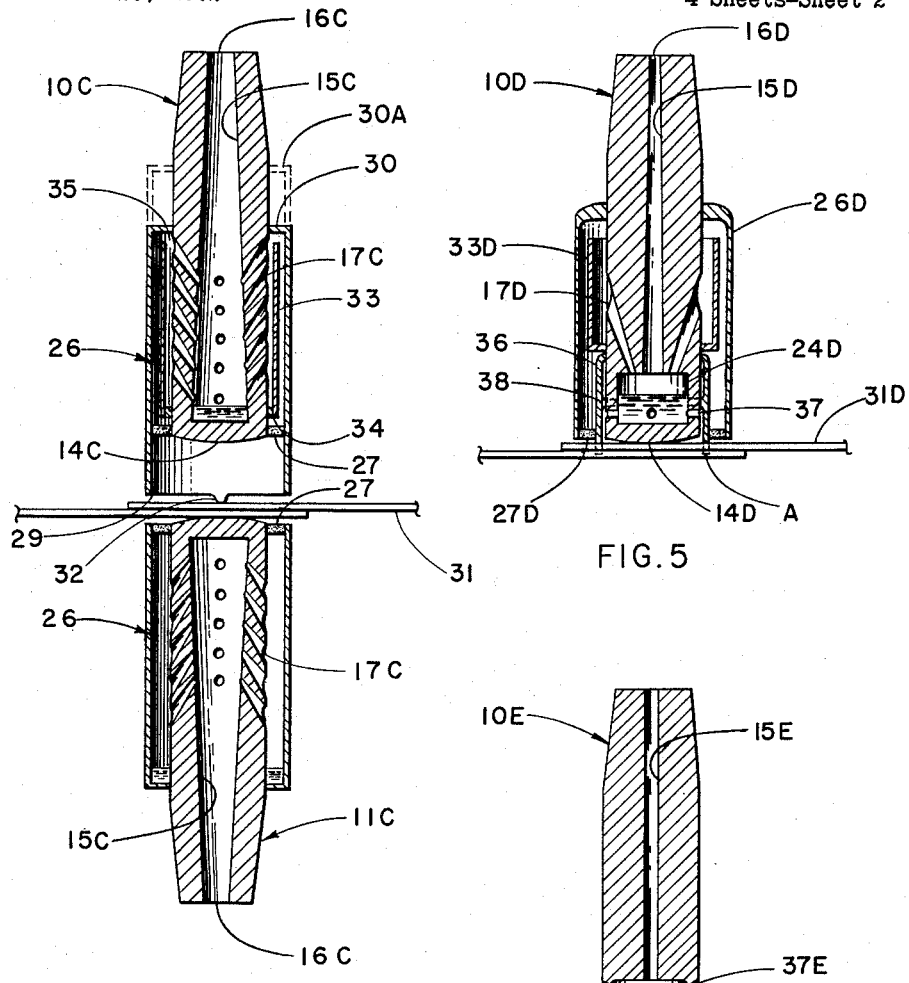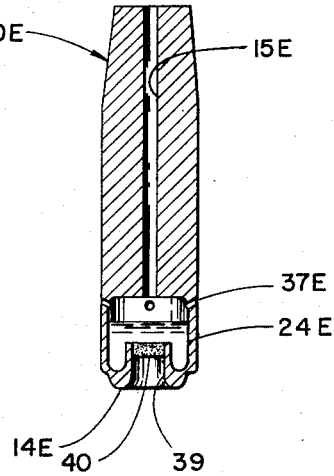

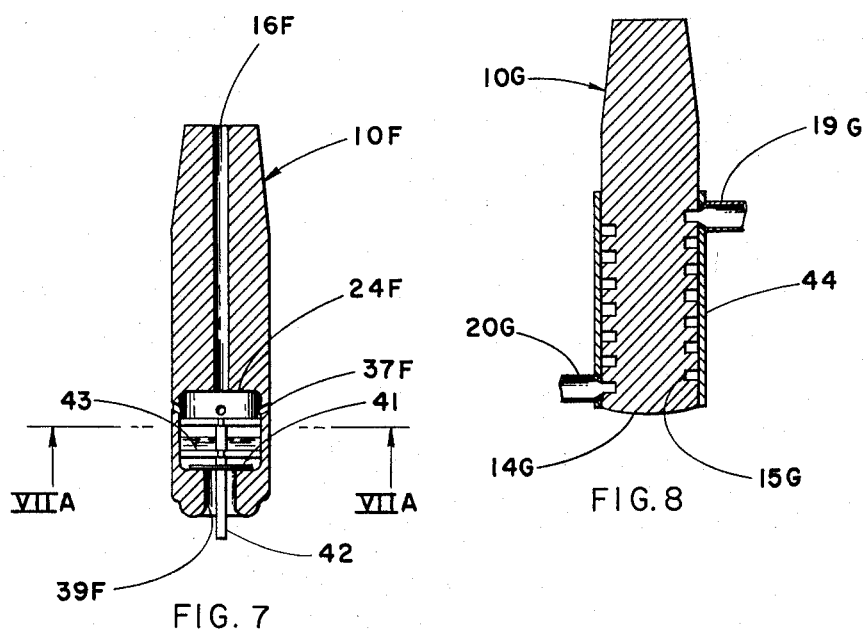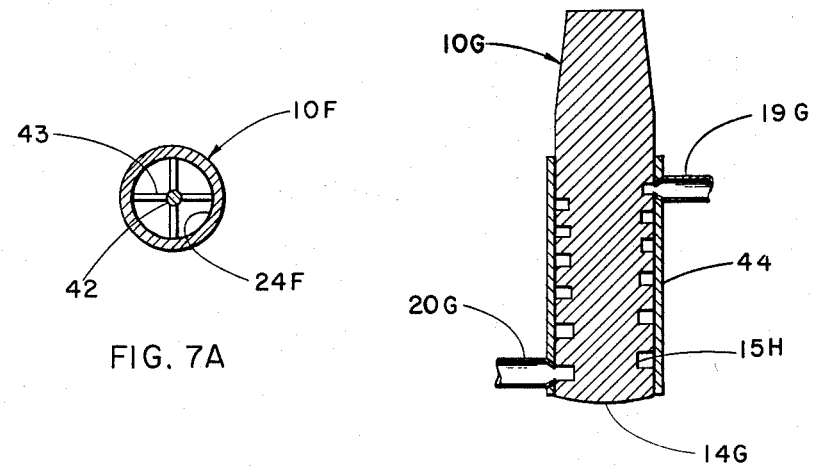

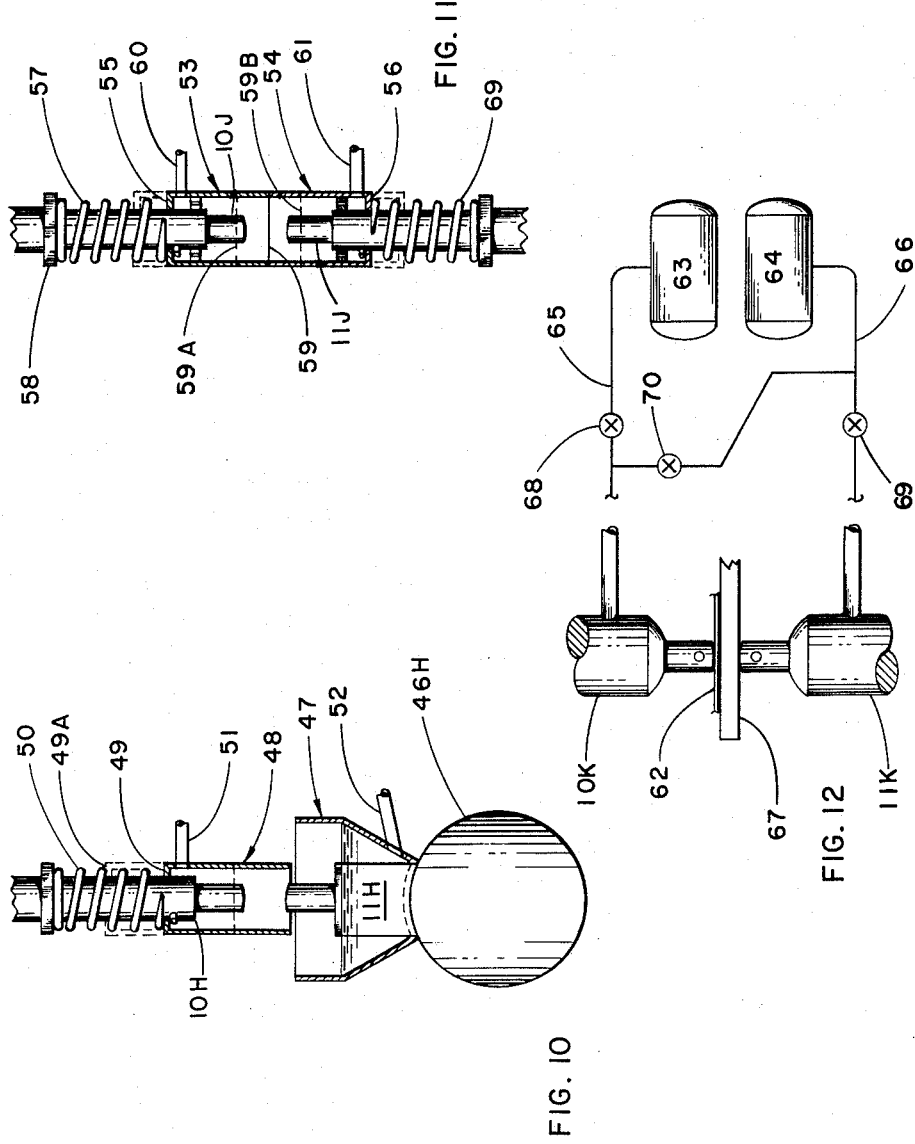

3,119,007
RESISTANCE WELDING MEANS AND METHOD
George W. Kreiter, Irving, and John H. Riza, Grand Prairie, Tex., assignors to Ling-Temco-Vought, Inc., Dallas, Tex., a corporation of Delaware
Filed Feb. 26, 1962, Ser. No. 175,411
23 Claims. (Cl. 219—91)

This invention relates to the joining of electrically conductive parts by resistance welding and particularly to a means and method of joining together parts whose properties preclude or render unsatisfactory their joining by conventional resistance welding.

The high melting points, relatively excellent strengths, and other favorable characteristics of the refractory metals, including molybdenum, columbium, tungsten, tantalum, and the like, tend to make these metals of great value in high-temperature usages such as for the outer surfaces of hypersonic aircraft, for certain industrial applications, etc. In many applications, it would be desirable to join refractory metal sheets or similar members by means of spot welding, but this has presented serious difficulties which, until the present, have seriously hampered the use of refractory metals and thereby delayed advances which the ready usage of these materials would have made possible.

Considerable effort has been expended in attempts to spot weld the metal molybdenum, for example, and the results obtained have been far from satisfactory. Where a weld is obtained at all, the molybdenum base material has been of greatly inferior strength in the region of the weld nugget, and the event of welding molybdenum to molybdenum has strongly tended to be accompanied by electrode pick-up (i.e., softening or melting of the electrode tips followed by adherence to the molybdenum). While electrode sticking and failure to obtain a satisfactory weld or even any weld at all are problems which are not limited to spot-welding or to the resistance welding of molybdenum, spot-welding can for convenience be employed as exemplary of a resistance welding method, while molybdenum is more than typical as a material presenting resistance welding difficulties. Much of the following discussion, therefore, will be devoted to the specific example of spot-welding in molybdenum, and it will be understood that the principles set forth apply also to other materials and other resistance welding methods.

While commercial articles have contained molybdenum parts joined by spot-welding, this has largely if not altogether been confined to certain electronic applications in which the mechanical properties of the spot-welded joints are of little importance. Because "spot welds" in molybdenum have been excessively brittle and weak, they have been of little or no utility in other applications; and at least one writer has dismissed them as mere "pseudo-welds."

Electrode pick-up or sticking is the heretofore largely unavoidable consequence of two of the very attributes often rendering molybdenum extremely desirable in high-temperature environments, namely its high melting point and high electrical conductivity. Spot welding is essentially a process in which a nugget is melted from material of faying parts and recast in situ; and the high conductivity of molybdenum requires that an extremely heavy welding current be employed to bring about the necessary, localized melting. Unfortunately, the conductivity of the molybdenum is so near that of the electrodes, even when the latter are an alloy of high copper content, and the melting point of the electrodes is so low compared to that of the molybdenum, that the necessary current results in a softening or melting of the electrode tips, thus welding them to the molybdenum. Where actual sticking does not occur, the electrode tips nonetheless are quickly deformed by overheating and the welding pressure.

Various expedients to which resort has been made for preventing electrode sticking include the use of tungsten electrodes, placing a thickness of lead, etc. between the electrode tip and molybdenum, and introducing another material (such as nickel) between the molybdenum sheets in the area in which a spot weld is to be placed. Tungsten electrodes (with much higher melting point than copper) have proved of no avail in preventing sticking. Possibly more helpful, the placing of lead between the electrode tip and workpiece is not uniformly successful in preventing electrode pickup and eventuates in leading of the exterior surfaces of the molybdenum sheets. Fusing nickel between the sheets produces a relatively strong joint, but it does not actually join molybdenum directly to molybdenum but only nickel to molybdenum; and the temperature limitations involved are substantially those of nickel.

Even where electrode sticking fails to occur, the properties of joints made by resistance welding in molybdenum leaves so much to be desired that no such joints have been considered satisfactory for structural use. Much of the strength of molybdenum is imparted to it by strain hardening. The spot weld nugget, formed after strain hardening, is recrystallized and hence is of a coarse-grained structure of lowered strength and virtually no ductility at room temperature. Because of the great thermal conductivity of molybdenum, however, bringing the metal to a temperature sufficient for melting in the desired nugget location results in heating a comparatively large surrounding area to a temperature at which coarse-grained recrystallization occurs without melting. This heat-affected area, while of the same material as the remainder of the sheet, is of practically no ductility and is of greatly inferior strength; in addition, the heat-affected area is apt to become very brittle by action of impurities (nitrides, carbides, etc.) precipitated, at high temperatures, at the grain boundaries. The deleterious effects of spot-welding on molybdenum are so extensive that failure, in tension shear, nearly always occurs in the heat-affected zone outside the nugget rather than in the nugget. While it might be expected that the large-grained nugget would be of lowered strength, it is apparent that the strength of the remainder of the heat-affected zone is even lower and that the over-all strength of the molybdenum sheet has been decimated. Strength in the heat-affected region is also much reduced by visible as well as microscopic cracking which occurs in the weakened, brittle, heat-affected zone extending well beyond the electrode area. The losses of strength and ductility from these sources have been so great as to render spot-welded molybdenum unfit for structural (i.e., load-carrying) applications.

Even in other than refractory metals, difficulty is experienced in spot welding a thin piece to a thick piece; for example, in aluminum, where a nugget is obtained at all, it tends to extend through the entire thickness of the thicker piece and to have little if any penetration into the thinner piece. In stainless steel, to cite another example, melting often occurs only within the interior of the thicker sheet, while no nugget formation at all occurs in the thinner sheet. In aluminum, stainless steel, and titanium, for example, it has not been found practicable to spot weld pieces differing in thickness by more than 4:1. As noted above, the spot-welding of even same-thickness parts in molybdenum has not previously been practicable on a production basis, and a very considerable degree of similar difficulty has been encountered in spot-welding other refractory metals.

The sticking of electrodes has been a problem not only in the attempts which have been made to spot-weld molybdenum and the like, but also has hampered or made impossible the spot-welding of conventional materials of considerable thickness. Electrode pick-up often becomes a serious problem, for instance, in joining steel armor plates because of the high current density required for obtaining adequate heating in the thick material and the high electrode pressure required for obtaining a satisfactory forging pressure at the plate-to-plate interface.

It is, accordingly, a major object of the present invention to enable the successful resistance welding of the refractory metals including tungsten, tantalum, and columbium and especially including molybdenum.

Related objects are to enable the resistance welding of molybdenum and the like without electrode sticking and to increase greatly the strength of resistance welded articles of molybdenum and the like.

Another object is to increase the ductility in the weld region in a resistance welded article made of a refractory metal.

Another object is to enable the resistance welding of thicker pieces of materials than it previously has been possible to join effectively by resistance welding methods.

A further object is to enable the resistance welding of refractory metal pieces of differing thickness and to increase the thickness ratio within which it is possible to weld together pieces of other metals of differing thickness.

Yet another object is to provide an improved apparatus for resistance welding which is especially useful in the welding of refractory metals.

A still further object is to provide, in a resistance welding apparatus, an improved electrode and means for chilling the same.

An additional object is to increase resistance weld strength in other metals in addition to the refractory metals by enabling the formation, in a resistance welding machine of given current-delivering capacity, of a larger nugget without electrode sticking.

Yet another object is to enable the resistance welding of two pieces together where the two pieces are of the same or greater room-temperature heat conductivity as the welding electrodes, for example, the spot welding of substantially pure copper sheets with use of copper alloy electrodes.

Other objects and advantages will be obvious from the specification and claims and from the accompanying drawing illustrative of the invention.

In the drawing,

FIGURE 1 is a diagrammatic view of parts of a spot-welding machine with which is associated the reservoir containing a liquid, normally gaseous fluid;

FIGURE 2 is a longitudinal sectional view of the adjoining end portions of a pair of electrodes adapted for the circulation of a fluid therethrough;

FIGURE 3 is a longitudinal sectional view of a novel electrode according to the invention;

FIGURE 4 through 7 and FIGURES 8 and 9 are longitudinal sectional views of other modifications of the electrode element;

FIGURE 7A is a plan view of one of the guides shown in FIGURE 7 taken as at line VIIA—VIIA of FIGURE 7;

FIGURE 10 is a side view of electrodes with which are associated a form of the means limiting ice formation on the electrodes;

FIGURE 11 is a similar view presenting another modification of the ice-limiting means; and FIGURE 12 is a diagrammatic view illustrative of a means and method for the joining of parts of different thicknesses.

With initial reference to FIGURE 1, the spot-welding device comprises a spot-welding machine which may be of any desired make and employing a pair of electrodes 10, 11 of any of the forms described below. A reservoir 12 contains a liquid 13 which normally (i.e., at ordinary room temperature and pressure) is a gas; examples include, but are not limited to, liquid hydrogen, helium, argon, nitrogen, oxygen, air, and carbon dioxide. The electrodes 10, 11 are carried by a movable upper arm 45 and fixed lower arm 46.

In practice of the invention, electrodes have been employed which are of the form shown in FIGURE 2 wherein each electrode (for example, the upper electrode 10A) is a rod having at one of its ends a workpiece-engaging tip 14. Within the rod is an axially extending passage 15 into which opens, near the passage end opposite the work-engaging tip, an inlet port 16 from whence a tube 19 extends interiorly of the rod to a location near its tip 14. Fluid flow enters the inlet port 16, passes out of the free end of the tube 19, then flows back through the passage 15 about the tube outer surface and exits through an outlet port 17 via a tube 20. The lower electrode 11A is similarly constructed. For ready variation of the size and radius of the electrode tip 14, it has become customary to make the rod end portion forming the tip as a separate, removable piece 18 which fits snugly into the passage 15 at an end of the larger portion of the electrode 10A or 11A. The electrode 10A or 11A thus may be a single, unitary element or, as shown, may include a removable element or portion 18 on whose outer end is the workpiece-engaging tip 14.

Means are provided for supplying fluid from the reservoir 12 (FIGURE 1) to at least one of the electrodes 10, 11. Since the air about the reservoir 12 is at a higher temperature than the cryogenic liquid 13 in the reservoir, the liquid boils and tends to increase fluid pressure in the reservoir. This pressure conveniently is utilized to effect transfer of fluid 13 from the reservoir 12 to the upper electrode 10 through a delivery line 19. A similar tube may deliver fluid to the lower electrode or, as shown, a single delivery tube 19 may be employed and a tube 20 employed to lead fluid discharged from the upper electrode outlet port 17 (refer also to FIGURE 2) into the lower electrode 11. After circulation through the two electrodes 10, 11, the fluid passes from the lower electrode 11 through the tube 21 (FIGURE 1).

The extremely low temperatures to which the electrodes 10, 11 are cooled by the fluid 13 from the reservoir 12 render the electrodes 10, 11 extremely susceptible to icing from water condensed from the air. Although a thin film of ice can be tolerated on the electrode tips 14, the presence of ice is generally undesirable and is prohibitive where the ice is so thick as to prevent electrical conductance through the electrode tips. The inhibit this ice formation, it has been found of excellent advantage, particularly where the parts to be spot-welded are small, to provide the following arrangement. A receptacle 22 placed beneath the electrodes 10, 11 has sides which rise approximately to the level of the tip of the stationary lower electrode 11, and into this receptacle is fed, through tube 21, the outflow of cold fluid from the electrodes. Depending upon factors including the rate of flow through the electrodes 10, 11, which rate is controllable by any suitable valve means 23, the fluid entering the receptacle 22 will be either liquid or gaseous or a mixture of both liquid and gas; liquid 13 discharged into the receptacle of course will soon pass into the gaseous state. By employing in the reservoir 12 a liquid 13 which is water-free, a dry atmosphere is supplied into the receptacle 22 from the electrodes 10, 11 and, upon filling and overflowing the receptacle 22, forms a body of dry gas which surrounds and excludes moist air from the tips of the electrodes 10, 11. Other arrangements for greatly slowing or entirely preventing ice formation on the electrodes 10, 11 will be described in later paragraphs.

A preferred form of electrode element for use in the spot-welding device utilizing cryogenic cooling of the electrodes is shown in FIGURE 3 wherein the rod, preferably made of copper or a copper alloy, has one end forming a tip 14B adapted for engaging a workpiece (not shown); the rod other end (not shown) is attached in the spotwelding machine in any convenient, conventional manner. A passage 15B extends within the rod 10B and has a first end which lies in the region of the tip and a second end more widely spaced from the tip. An inlet port 16B opens into the passage 15B at or near its second end, and at least one outlet port 17B opens into the passage in the region of the electrode tip 14B. The passage 15B, adapted for receiving and conducting a fluid flow, thus has a downstream end in the region of the electrode tip 14B. Extending from the region of the tip 14B to the upstream location of the inlet port 16B, more widely spaced from the tip 14B, the passage 15B is fed with the cryogenic fluid through a tube 19B connected into the inlet port. Near its downstream end, the passage 15B is tapered in a manner wherein its cross-sectional area increases toward the electrode tip 14B, thus forming an expansion chamber 24 with a diverging wall portion 25. For maximum cooling at the tip 14B, the expansion chamber 24 extends as near the tip (i.e., the electrode end surface) as is consistent with adequate strength of the electrode 10B under necessary welding pressures. The outlet ports 17B are spaced about the circumference of the rod 10B and open into the diverging portion 25 of the passage 15B above the normal operating level of cryogenic liquid in the expansion chamber 24.

Without describing again details of construction already described in connection with FIGURE 3, subsequent figures of the drawing include other embodiments and modifications of the electrode element. In FIGURE 4, for example, the passage 15C is tapered from the inlet port 16C to the passage downstream end, the passage end of greatest cross-sectional area being near the electrode tip 14C. Expansion of the fluid thus is possible throughout the length of the passage 15C and is enhanced by the circumferentially and axially spaced outlet ports or passages 17C which extend from the main passage 15C to the exterior of the rod 10C or 11C. Means for maintaining a dry atmosphere about the electrode tips 14C include an outer jacket 26 and porous bulkhead 27. Although it may be omitted from the lower electrode 11C, an inner jacket 33 is further included at the upper electrode 10C. The outer jacket 26, whose sidewall is in spaced, encircling relation to the rod 10C, has an end 29 in the region of the tip 14C and slightly spaced therefrom along the axis of the rod; more widely spaced from the tip, the jacket other end is provided with an end wall 30 which sealingly encircles the rod 10C. At the jacket end 29 adjacent the tip 14C, the annular, porous bulkhead 27 is rigidly affixed on the rod 10C in encircling relation to the same and extends between the rod and sidewall of the jacket. The bulkhead 27 thus forms a lower end wall for the compartment or chamber enclosed by the outer jacket 26 and is closely spaced from the electrode tip 14C, the chamber being opened into by the passage outlet ports 17C. Where operating conditions tend strongly to produce icing of the electrode tip 14C, the outer jacket 26 is made slidable relative to the rod 10C and bulkhead 27 in order that it may be extended beyond the tip 14C, as shown in the case of the upper electrode 10C, which is illustrated as spaced from the workpieces 31. Dry gas passing outwardly through the porous bulkhead 27 (made, for example, of sintered bronze) forms a smooth flow which isolates the tip 14C from atmospheric moisture; and envelopment of the tip by the dry gas is aided by the extended portion 29 of the outer jacket 27. When the electrode tip 14C is brought into contact with the workpieces 31 (see the lower electrode 11C), the outer jacket is slid back along the rod to a position in which the end wall is at 30A and the jacket lower end 29 preferably is retracted slightly beyond the electrode tip 14C. To achieve the desired degree of retraction, one or more projections such as 32 may be provided on the outer jacket rim where they will be contacted first by the workpiece 31. To prevent significant and undesirable conductance of electrical current through the outer jacket 26, the latter is made of stainless steel or other suitable material of higher electrical resistance than the rod 10C. Where icing conditions are of lesser severity, the jacket 26 need not be extensible and is rigidly attached on the rod 10C in its retracted position.

When a cryogenic liquid flow is introduced into the inlet port 16C of either the lower or upper electrode 10A or 11A, much or all of the liquid vaporized within the passage 15C passes through the outlet ports 17C into the chamber enclosed by the outer jacket, and from thence flows out around the electrode tip 14C through the porous bulkhead 27. Depending upon the rate of supply of the liquid, however, enough liquid may be received to preclude its complete vaporization in the passage 15C, whereupon the excess liquid flows or is carried in the gaseous flow out of the rod 10C or 11C and into the chamber enclosed by the outer jacket 26. In the case of the upper electrode 10C, this liquid would collect over the porous bulkhead 27 and interfere with the needed flow of gas through the latter. This is prevented by the inner jacket 33. Spaced between the rod 10C and outer jacket 26 and having a lower end adjacent the porous bulkhead 27, the inner jacket 33 has an end wall 34 which forms a seal and rigid, fixed interconnection between the rod 10C and inner jacket 33. Liquid emerging from the passage is caught in the inner jacket, within which it vaporizes and from which it passes through at least one port spaced from the inner sleeve lower end wall 34 so as to lie above the trapped liquid and communicate between the interior and exterior of the inner jacket 33. Such a port 35 is conveniently provided by leaving the inner jacket 33 open at its upper end. The inner jacket 33 may be omitted from the lower electrode element 11C, in which gravitational forces are instrumental is producing collection of any liquid that leaves the passage 15C in the end of the outer jacket 26 most widely spaced from the electrode tip 14C and in which, therefore, only gases reach the porous bulkhead 27.

In the modification shown in FIGURE 5, the outer jacket 26D is rigidly mounted on the rod 10D, while the porous bulkhead 27D in turn is rigidly mounted within the lower end of the outer jacket 26D. The upper end of the rod 10D again is provided with an inlet port 16D leading into an inlet passage 15D which may diverge, as shown, toward the electrode tip 14D and which opens, at its inner end, into an expansion chamber 24D which is formed in the rod adjacent the electrode tip 14D. The inner jacket 33D is as before except that it is inturned at its lower end to provide an end wall which lies well above the electrode tip to provide room for the sleeve 36 (to be described). At least one passage 17D extends through the rod 10D from the expansion chamber 24D at the upper wall of the latter into the space enclosed between the rod 10D and inner jacket 33D. While the outlet passage or passages 17D form an outlet or outlets for the expansion chamber 24D, there is in addition provided at least one outlet port 37 which is located below the usual level of liquid in the expansion chamber 24D and extends radially from the latter to open through the surface of the rod 10D above its tip. The sleeve 36 is of somewhat larger diameter than the adjoining portion of the rod 10D and thus provides an annular flow-space between itself and the rod. The inturned upper end of the sleeve 36 closely encircles the rod 10D to provide a sliding, substantially leak-proof fit. The sleeve 36 is slidable between a first position in which its lower edge extends below the rod tip as at A and a second position (obtained by pressure of the workpiece 31D when the latter is contacted by the electrode tip 14D) in which its lower edge is in register with the tip. Closure means are carried on the sleeve 36 in the form, for example, of an annular shoulder 38 extending around the inner periphery of the sleeve. The shoulder 38 is so positioned that it closes the outlet ports 37 when the sleeve 36 is in its first position in which its lower edge is at A and leaves the outlet ports 37 open when the sleeve, as depicted, is in its second position. The porous, annular wall or bulkhead 27D encircles and slidingly engages the outer surface of the sleeve 36.

Liquid introduced into the expansion chamber 24D through the inlet passage 15D lies at the bottom of the chamber; gas evolved from this liquid passes into the inner jacket 33D, along with any liquid carried by the gas, through the passages 17D. When the electrode element 10D is spaced from the workpiece 31D, the sleeve 36 is moved by gravity to its first position A in which the shoulder 38 closes the outlet ports 37, thus preventing an outflow of liquid from the expansion chamber 24D. Upon the sleeve 36 being moved to its second position by contact with the workpiece 31D, the outlet ports 37 are open, and liquid flows through the outlet ports 37 and the space between the sleeve 36 and rod 10D onto the workpiece 31D around the electrode tip 14D, in which area it tends to be confined by the lower edge of the sleeve 36, which contacts the workpiece 31D. No difficulty arises from the escape of some of this gas under the lower edge of the sleeve 36; in addition, however, gas may pass back through the outlet ports 37 and out of the expansion chamber 24D through the passages 17D. It will be within the ability of a designer familiar with the above to add a spring, etc. for biasing the sleeve 36 to its first position A where this is desired.

FIGURES 6 and 7 show modifications of the electrode element employing first and second expansion chambers. In FIGURE 6, the inlet passage 15E opens into a first expansion chamber 24E which forms, in effect, a portion of the passage 15E which, lying in the region of the passage downstream end, is of substantially greater cross-sectional area than the remainder of the passage. The first expansion chamber 24E is axially spaced from the electrode tip 14E. A bore formed through the tip 14E on the rod centerline extends into the first chamber 24E and forms a second expansion chamber 39; the opening of the bore into the first chamber 24E forms an outlet port for the latter and is an orifice providing communication between the first chamber 24E and second chamber 39. The outlet port for the second chamber 39, of course, is its opening through the tip 14E. At least one other outlet port 37E is spaced from the rod tip 14E and opens to the exterior of the rod 10E from the first expansion chamber 24E. The first chamber 24E preferably has an annular extension toward the electrode tip 14E which encircles the upper end of the second chamber 39.

Means for governing fluid flow through the orifice giving communication between the first and second chambers 24E, 39 are provided in the form of a porous plug 40 of a ceramic or sintered material, etc. and so located as to close off the orifice. A desired rate of flow of liquid from one chamber 24E to the other 39 is obtained by employing a plug 40 of a suitable degree of porosity. Because of the opening of the second chamber 39 through its tip 14E, the electrode element 10E of FIGURE 6 tends to produce an annular weld, as does the electrode described immediately below.

In FIGURE 7, the electrode element 10F again has an inlet passage 16F, first expansion chamber 24F, second expansion chamber 39F with a port or orifice communicating between the first and second chambers 24F, 39F, second chamber outlet port through the electrode tip 14F, and at least one other outlet port 37F near the top of the first chamber 24F. A body movable axially of the rod for closing the orifice is provided in the form of a disc 41 which lies within the first chamber 24F and is rigidly mounted on a pin 42 which extends through the disc 41 from the second chamber 24F into the first chamber 39F. When the disc 41 is in position to close the associated orifice, the lower end of the pin 42 extends beyond the electrode tip 14F through the outlet port of the second chamber 39F. Contact of the pin 42 with a workpiece (not shown) upon the electrode 10F being brought into contact with the latter moves the disc 41 upwardly into a position in which the orifice between the chambers 24F, 39F is open. The pin 42 and disc 41 are kept properly positioned in the rod 10F by a spaced pair of spiders 43 whose outer ends slidably bear, as shown in FIGURE 7A, on the wall of the first chamber 24F.

In FIGURE 8, the passage 15G has a first end at which is an inlet port connected to a supply tube 19G leading from a source of the cryogenic fluid. The passage 15G, which extends from its first end toward the electrode tip 14G, forms a spiral about the axis of the rod 10G and has an outlet port which marks the other end of the passage 15G and lies near the tip. A tube 20G may be fitted into the outlet port for carrying off discharged fluid. A convenient way of forming the spiral passage 15G interiorly of the electrode element 10G is to cut a spiral thread or groove in the element, then slip over this a tightly fitting sleeve 44 through which the inlet and outlet ports pass for connection with tubes 19G, 20G. In FIGURE 9, the passage 15H is readily tapered to become wider toward the electrode tip 14G by cutting the groove 15H to make it progressively wider and/or deeper with increasing nearness to the electrode tip.

FIGURES 10 and 11, which particularly show means for limiting the formation of ice on the electrodes, employ chilled electrodes which are chosen from any of the electrode elements described above; for simplicity of illustration, the means for supplying cryogenic fluid to the electrodes is not shown. In FIGURE 10, the lower electrode 11H is carried by the lower arm 46H of the spot-welding machine. On the lower arm 46H (or on the electrode 11H) is mounted an open-topped vessel 47 which surrounds and extends to approximately the level of the upper end of the lower electrode 11H. On the upper electrode 10H is slidably mounted an open-bottomed vessel 48 whose end wall 49 closely encircles the electrode 10H. The upper vessel 48 is movable as shown to a first position in which it extends below the upper electrode 10H and preferably, when the electrodes 10H, 11H are spaced apart, to or below the upper end of the lower electrode 11H. For exposing the upper electrode 10H, the upper vessel 48 is movable to a second position in which its bottom edge is in register with or above the lower end of the upper electrode and its upper end wall is at 49A. Where desired, resilient means (such as the spring 50) may be employed to bias the upper vessel 48 to its lowermost position. Tubes 51 and 52 lead from a suitable source or sources of dry gas into the upper and lower vessels 48, 47 respectively, or a liquid, water-free cryogenic may be supplied through tube 52 into the lower vessel 47, in which it will boil to form a dry gas. Gas filling and passing upwardly from the lower vessel 47 surrounds the lower electrode 11H and tends to displace air from the upper vessel 48 surrounding the upper electrode; thus, particularly when spot-welding small parts, the upper tube 51 may be dispensed with in some cases. When spot-welding large sheets, however, the upper tube 51 is more critically needed since the sheet tends to shut off upward gaseous flow into the upper vessel 48 from the lower vessel 47.

Still more extensive protection against icing of the electrode tips is afforded by the modification shown in FIGURE 11. The upper vessel 53, whose sidewalls are coaxial with the upper electrode 10J on which it is mounted, has an upper end wall 55 which closely and slidingly encircles the electrode. A spring 57 footed on a collar 58 or the like on the electrode 10J bears against the upper end of the upper vessel 53 and urges it toward the tip of the electrode. The upper vessel 53 has a rim 59 which defines its open lower end. A similar, lower vessel 54, inverted so that its open end faces upwardly, is slidably mounted on the lower electrode 11J. Urged toward each other by their respective springs 57, 69, the rims of the two vessels 53, 54 meet, as shown; and the two vessels together form a compartment enclosing the tips of the electrodes 10J, 11J. A dry gas is supplied into this compartment through tubes 60, 61 leading, respectively, to the upper and lower vessels 53, 54. To expose the tips of the electrodes 10J, 11J, the vessels 53, 54 are movable apart to retract their respective rims, as at 59A, 59B, to a position at or beyond the tip of the associated electrode.

The method of joining electrically conductive parts by spot-welding comprises providing a reservoir, as described, containing a liquid, normally gaseous fluid chosen from the group comprising hydrogen, helium, argon, nitrogen, oxygen, air, and carbon dioxide. The choice depends upon the electrode temperature desired. Liquid nitrogen has been found to yield a low enough electrode temperature for satisfactory spot-welding operations on molybdenum, a metal in which satisfactory spot welds have not previously been obtained. While liquid nitrogen readily lowers the electrode temperature into the range of −300° F., still lower temperatures are obtainable by use, for example, of liquid helium or hydrogen. An electrode temperature at least as low as −100° F. is necessary for practice of the invention, and this temperature is obtainable by use of liquid carbon dioxide.

The fluid from the reservoir employed to chill the electrodes is preferably still in liquid form upon reaching the electrodes. Where an electrode is of the kind disclosed wherein the fluid is circulated through the electrode, it is preferable that the liquid be largely if not completely vaporized before leaving the electrode, for efficient chilling is obtained in this way with economy of use of the liquified gas from the reservoir. The chilling of the electrodes is begun while they are spaced from the parts to be spot-welded in order that the parts, and especially their interface or area of mutual contact, will not be greatly cooled before the passage of current but will remain in the vicinity of room temperature. While the electrical conductivity of the electrodes is thus greatly increased, resistance at the interface between the workpieces is not significantly lowered.

Since the passage of the cryogenic fluid through them quickly plunges the electrodes far below the freezing point of water, atmospheric water tends to form a coating of ice on the electrodes which renders their tips non-conductive. Icing is limited by maintaining a dry atmosphere about at least the tips of the electrodes. Thus, as shown in FIGURE 1, the outflow from the electrodes 10, 11 enters the vessel 22 through tube 21. Using liquid nitrogen, for example, to cool the electrodes 10, 11, good ice prevention is obtained where the discharge of tube 21 is entirely gaseous and also where an appreciable amount of liquid nitrogen enters and vaporizes in the vessel 22. The soft flow of dry gas discharged through the porous bulkheads 27, 27D shown in FIGURES 4 and 5 and the porous plug 40 of FIGURE 6 prevents or greatly inhibits ice formation on the tips of the electrodes shown in those figures. The manner in which a dry atmosphere is provided about the electrodes of FIGURES 10 and 11 has already been described. The dry atmosphere is maintained about the electrodes throughout the spot-welding operation.

The chilled electrodes are brought together to compress the workpieces between them, and the welding current is passed through the parts via the electrodes. Cooling of the outer surfaces of the workpieces of course begins immediately upon their being contacted by the electrode tips, and this is in no way undesirable but instead is of benefit in obtaining a good spot weld. The flow of welding current is best started, however, before the cold strikes through the workpieces enough to chill them greatly at the interface between them. In this way, the welding current encounters a greatly lowered resistance at the contacts between the electrodes and workpieces, but resistance at the work-to-work interface is not lowered, and the latter area thus is first to rise to a melting temperature. Temperature rise occurs, of course, in the electrodes and at their contacts with the workpieces, but the rate and amount of heat evolution is much lowered by the greatly increased conductivity of the electrodes. Furthermore, the electrodes tips are very cold before initiation of and continue to be cryogenically chilled during the flow of current; and even though their temperature rises during current flow, the rise is not enough to produce softening of the electrode material. As a consequence, the problems of electrode deformation and sticking are alleviated when spot-welding molybdenum or even tungsten. Relatively much colder than the nugget formed in the workpieces, the electrodes act as heat sinks which with extreme rapidity quench the weld area after cessation of the flow of welding current. The extent and nature of recrystallization are a function of the time the nugget remains at a recrystalizing temperature. The longer this time, the larger is the region within the spot-welded part which is raised, by thermal conductance of heat away from the nugget, to a recrystalizing temperature, and the larger are the crystals produced. Generally deleterious in any metal, this recrystallization is especially undesirable in molybdenum, in which the high thermal conductivity and melting point result in a very large and excessively brittle and weak recrystalized area when an attempt is made to employ previous spot-welding methods. In consequence of this weakness, even the nugget often is stronger than the surrounding portions of the heat-affected zone, for tension shear loads consistently result in failure of the part outside of (rather than within) the nugget when attempts are made to spot-weld molybdenum by conventional methods. Because of the very quick quenching afforded by the cryogenically chilled electrode tips, the time during which the hottest part of the molybdenum is at a temperature capable of supporting recrystallization is very brief. As a result, the maximum distance from the nugget throughout which the molybdenum is raised to recrystalizing temperature is much smaller: the heat-affected zone portion outside the nugget is reduced to a mere "skin" about the nugget. Furthermore, there is less change within even this small zone, for there is less time for crystal growth and re-orientation. As a consequence, the original strength of the molybdenum parts is not significantly impaired as it would be by a recrystallization extensive in both area and nature. Besides the weakness and brittleness engendered by extensive change in crystal form itself at high temperatures, the deleterious effects of the collection of impurities at the grain boundaries in the metal are important, for such impurities (oxides, nitrides, carbides, etc.) greatly increase brittleness. In cold-working the metal, these collections are broken up; but they re-form upon the metal being raised, for a sufficient time, to a recrystalizing temperature. By virtue of the quick quenching of the present method, there is not enough time for this formation to progress very far toward completion, and much of the ductility and strength of the metal are preserved in the heat-affected area. The tendency toward cracking in the spot weld area is also much reduced.

Using the present method, excellent spot welds are possible in molybdenum. Electrode sticking is entirely eliminated, and failure under shear loads tends to be within (rather than outside) the nugget. Employing the present method, spot welds which are crack-free and with a strength of over 1500 pounds have been obtained, in a given gage, in molybdenum, and spot welds with strength over 2550 pounds have been obtained in columbium. Only by rare exception have spot welds with strength over approximately 615 pounds have previously obtained, in the same gage, in molybdenum, and these have almost without exception been accompanied by cracking of the molybdenum and sticking of the electrodes. Similarly, previous spot welds in columbium have had strengths in the range of only 650 pounds. Round nuggets of good penetration are formed in tungsten without the usual tendency toward shattering, and improved spot welds are obtained in tantalum. The method enables the ready spot-welding together of parts of pure copper, and its usefulness is contemplated in the spot-welding of non-metallic but conductive materials such as plastics, cermets, and the like incorporating a conductive material.

For spot-welding together very thick pieces (for example, armor plate), chilled electrodes such as described are brought into contact with the workpieces and held there for a time to chill the work from the outside inwardly before the welding current is passed, and chilling of the work and electrodes is continued during the welding interval. Although the long welding time required for producing sufficient melting in very thick parts is not reduced, the chilled electrodes withstand this welding time without deforming or sticking, and this is by virtue of their lowered resistance, initial low temperature, and continued chilling during the current flow.

In welding a thin piece to a thick piece (for example, where the thickness ratio in aluminum alloy or steel is in the range of 1:8), a first electrode of given resistivity is provided for contacting the thicker part, and a second electrode of higher resistivity is provided for contacting the thinner part. Thus, for example, in FIGURE 12, the electrodes 10K, 11K represent schematically any of the electrode elements shown in FIGURES 2–9 except that the first electrode 10K, intended for contacting the thinner workpiece 62, is of higher resistance than the other electrode 11K, which contacts the thicker piece 67. A first reservoir 63 is provided containing a first liquid, normally gaseous fluid (for example, nitrogen) of given boiling point. A second reservoir 64 contains a second liquid, normally gaseous fluid (for example helium) of lower boiling point. A line 65 supplies the first fluid to the first electrode 10K and a line 66 conducts the second fluid to the second electrode 11K. In some cases, as in stainless steel where sticking of the higher-resistance electrode 10K is not a problem, chilling of this electrode is omitted. Spot-welding together parts of greater than 4:1 thickness ratio has not previously been practicable because the nugget, if any, tended to form all in the thicker part; but when a large initial temperature difference and resistance difference is provided between the electrodes 10K, 11K as described above, a spot weld which penetrates well into the thinner part 62 is produced. To establish the temperature difference between the electrodes 10K, 11K, it will be understood that in some cases it will be desirable to employ the same cryogenic fluid for both. Thus, in FIGURE 12, valve 68 may be shut off to prevent flow of the fluid from the first reservoir 63 to the first electrode 10K. Valve 70 then is opened to supply the second fluid to the first electrode 10K, but in a lesser amount than the flow through valve 69 to the second electrode 11K. The second electrode 11K thus is cooled more than the first electrode 10K. Whereas satisfactory spot welds have not previously been possible at all in molybdenum and also have presented serious difficulties in the other refractory metals, even molybdenum parts of different thicknesses can be spot-welded together by using the present method. For such purpose, both electrodes 10K, 11K are chilled as described above, the electrode 11K contacting the thicker part 67 being chilled the most, thus providing the needed difference both in temperature and electrical resistance.

It will be evident that various modifications, beyond those shown and described herein, are possible in the arrangement and construction of the steps and components of the invention without departing from the scope thereof.

We claim:

1. The method of joining faying, electrically conductive parts by spot-welding comprising:

providing a reservoir containing a liquid, normally gaseous fluid;

maintaining the tips of a pair of electrodes substantially ice-free by continuously maintaining about them a dry atmosphere, said atmosphere being provided by evolving dry gases from the normally gaseous fluid and flowing the gases about the electrode tips;

continuously cooling the electrodes with fluid from the reservoir;

bringing the electrodes together to compress the parts between them after initiation of the two preceding steps;

and passing through the parts, via the electrodes, an electrical current sufficient to produce melting in the parts between the electrodes.

2. The method of joining together faying, electrically conductive parts by resistance welding comprising:

chilling a pair of electrodes, while spaced from the parts, with a liquid, normally gaseous fluid;

continuously cooling the exterior surfaces of the parts in the desired weld area by bringing the electrodes together to compress the parts between them;

and while continuing to chill the electrodes, passing through the parts, via the electrodes and commencing before the part-to-part interface between the electrodes has been fully cooled by the electrodes, an electrical current sufficient to produce melting in the parts between the electrodes.

3. The method set forth in claim 2 and further including the step which commences before and continues at least until initiation of said passage of current through the parts, said step comprising inhibiting ice formation on the electrodes by maintaining about them a dry atmosphere, said atmosphere being provided by evolving dry gases from said normally gaseous fluid and flowing the gases about the electrode tips.

4. The method of joining faying, electrically conductive parts of different thicknesses by resistance welding comprising:

providing a reservoir containing a liquid, normally gaseous fluid;

cooling at least one of a pair of electrodes, while spaced from the parts, with fluid from the reservoir to establish a temperature difference between them;

moving the electrodes together to compress the parts between them, the colder electrode being in contact with a thicker and the warmer electrode in contact with a thinner one of the parts;

and passing through the parts, via the electrodes and while continuing to cool at least one of the electrodes with fluid from the reservoir, an electrical current sufficient to effect melting in the parts between the electrodes.

5. The method of joining faying, electrically conductive parts of different thicknesses by resistance welding comprising:

providing a reservoir containing a liquid, normally gaseous fluid;

providing a first electrode of given resistivity and a second electrode of higher resistivity;

establishing a temperature difference between the electrodes by cooling at least the first electrode with fluid from the reservoir;

compressing the parts between the electrodes with the first electrode in contact with a thicker one of the parts and with the second electrode in contact with a thinner one of the parts;

and passing through the parts, via the electrodes and while continuing to cool at least the first electrode with fluid from the reservoir, an electrical current sufficient to effect melting in the parts between the electrodes.

6. The method of joining together faying, electrically conductive parts by resistance welding comprising:

providing a first reservoir containing a first liquid, normally gaseous fluid of a given boiling point;

providing a second reservoir containing a second liquid, normally gaseous fluid with a boiling point lower than that of the first liquid;

cooling a first one of a pair of electrodes located in spaced relation to the parts with fluid from the first reservoir to reduce its temperature to a given level;

cooling the second one of the electrodes, with fluid from the second reservoir, to a temperature lower than the temperature of the cooled first electrode;

moving the electrodes together to compress the parts between them, the colder electrode being in contact with a thicker and the warmer electrode in contact with a thinner one of the parts;

and passing through the parts, via the electrodes and while continuing to cool at least the second electrode with fluid from the reservoir, an electrical current sufficient to effect melting in the parts between the electrodes.

7. In a resistance-welding device having electrodes provided with passages for the circulation of a cooling fluid therethrough and further having a reservoir, in combination with the electrodes and reservoir:

a liquid, normally geaseous fluid contained in the reservoir;

means for circulating fluid from the reservoir through the passages of the electrodes;

and means receiving fluid circulated through the electrodes and maintaining an atmosphere evolved from said fluid about the electrodes.

8. For a resistance spot-welding machine, an electrode element comprising:

a rod having a tip adapted for engaging a workpiece;

a passage in the rod adapted for carrying a fluid flow and having a downstream end in the region of the work-engaging tip and extending therefrom to an upstream location more widely spaced from the tip;

a portion of the passage in the region of the passage downstream end which is of substantially greater cross-sectional area than passage portions more widely spaced from the electrode tip;

an inlet port opening into the passage in the region of said upstream location;

and at least one outlet port in said rod communicating between said passage portion of greater cross-sectional area and the exterior surface of the rod.

9. For a spot-welding machine, an electrode comprising:

a rod having a work-engaging tip;

a passage extending within the rod and having a first end in the region of the tip and a second end more widely spaced from the tip;

an inlet port opening into the passage at a location spaced from the passage first end;

at least one outlet port opening through the surface of the rod into the passage between the inlet port and rod tip and providing communication between the passage and rod exterior surface;

and a divergent portion of the passage located between the ports and of larger cross-sectional area at its end nearer the outlet port.

10. The electrode recited in claim 9 and comprising a plurality of outlet ports located in and extending radially from the passage divergent portion.

11. For a spot-welding machine, an electrode element comprising:

a rod having a work-engaging tip;

a passage within and forming a spiral about the axis of the rod, the passage having a first end in the region of the tip and a second end more widely spaced from the tip;

an inlet port opening into one of the ends of the passage;

and at least one outlet port opening into the other end of the passage, the passage being of increasing cross-sectional area between the inlet port and outlet port.

12. For a resistance spot-welding machine, an electrode element comprising:

a rod having a tip adapted for engaging a workpiece;

a passage in the rod adapted for carrying a fluid flow and having a downstream end in the region of the work-engaging tip and extending therefrom to an upstream location more widely spaced from the tip, the passage being tapered in a manner wherein its cross-sectional area increases toward the electrode tip;

an inlet port opening into the passage in the region of said upstream location;

and a plurality of spaced outlet ports communicating between the passage and the exterior of the rod.

13. The electrode element set forth in claim 12, said element further comprising:

an outer jacket with a sidewall which lies in spaced, encircling relation with the rod, has an end in the region of the electrode work-engaging tip, and has another end which is more widely spaced from the tip and provided with an end wall sealingly encircling the rod; and an annular, porous bulkhead closely spaced from the electrode tip and extending between the rod and jacket end, the outer jacket, end wall, and bulkhead together defining a chamber opened into by said outlet ports.

14. The electrode element as set forth in claim 13, the outer jacket being axially movable relative to the rod tip between a first position in which the electrode tip extends beyond the jacket end and a second position in which the jacket end extends beyond the electrode tip.

15. The electrode element recited in claim 13, the electrode further comprising:

an inner jacket spaced between the rod and outer jacket and having an end adjacent the outer jacket porous bulkhead;

sealing means between the rod and said inner jacket end;

and at least one port spaced from said end of the inner jacket and providing communication between the interior and exterior of the inner jacket.

16. For a spot-welding device, an electrode element comprising:

a rod having a lower end forming a tip adapted to engage a workpiece and further having an upper end;

an expansion chamber in the rod adjacent the tip;

an inlet passage extending from the chamber toward the rod upper end;

an outer jacket having one end sealingly and rigidly engaging the rod exterior between the rod upper and lower ends and another end adjacent and spaced upwardly from the rod tip;

an inner jacket intermediate and spaced from the outer jacket and rod and having a lower end inturned to sealingly and rigidly engage the rod at a point spaced from the rod tip;

at least one passage extending through the rod from the expansion chamber into the inner jacket;

at least one outlet port opening from the expansion chamber through the surface of the rod;

a sleeve of larger diameter than and encircling the rod at and above its tip and having an inturned upper end closely and slidably encircling the rod, the sleeve having a lower end and being slidable between a first position in which its lower end extends below the rod tip and second position in which its lower end is in register with the rod tip;

closure means carried on the sleeve and positioned to close the at least one outlet port when the sleeve is in its first position and to open the same when the sleeve is in its second position;

and a porous, annular wall extending between the outer jacket at its other end and the sleeve and rigidly mounted in the said other end of the outer jacket.

17. For a resistance spot-welding machine, an electrode element comprising:

a rod having a tip adapted for engaging a workpiece;

a passage in the rod adapted for carrying a fluid flow and having a downstream end in the region of the work-engaging tip and extending therefrom to an upstream location more widely spaced from the tip;

a portion of the passage in the region of the passage downstream end which is of substantially greater cross-sectional area than passage portions more widely spaced from the electrode tip;

an inlet port opening into the passage in the region of said upstream location;

an outlet port opening from the passage through the work-engaging tip of the rod;

and at least one other outlet port spaced from the tip and communicating between said passage portion of greater cross-sectional area and the exterior of the rod.

18. For a resistance spot-welding machine, an electrode element comprising:

a rod having one end forming a tip adapted for engaging a workpiece and further having another end;

a first expansion chamber spaced from the work-engaging tip within the rod;

a passage leading within the rod from the first expansion chamber toward the rod other end;

an inlet port into the passage;

a second expansion chamber opening to the rod exterior through the work-engaging tip;

an orifice providing communication between the first and second expansion chambers;

means governing fluid flow between the expansion chambers through the orifice;

and at least one outlet port communicating between the first expansion chamber and the exterior of the rod between said one and other ends of the rod.

19. The electrode element recited in claim 18, said means governing fluid flow through the orifice including a porous plug interposed between the first expansion chamber and the opening of the second expansion chamber to the rod exterior.

20. The electrode element recited in claim 18, said means governing fluid flow through the orifice including a body movable axially of the rod for closing the orifice and a pin rigidly extending therefrom and beyond the rod tip via the second chamber opening through the work-engaging tip when the body closes the orifice, whereby engagement of a workpiece by the tip forces the pin axially of the rod to move the body into a position wherein the orifice is open.

21. Means for inhibiting the formation of ice on upper and lower spot-welding electrodes cooled below the freezing point of water, said means comprising:

an open-topped vessel surrounding the lower electrode and extending to approximately the level of the electrode upper end;

an open-bottomed vessel movably mounted relative to the upper electrode and movable between a first position in which it extends below the upper electrode and a second position in which its bottom is at least in register with the lower end of the upper electrode;

and means supplying a dry gas to the bottom vessel.

22. The means recited in claim 21, said means including means supplying a dry gas to the upper vessel.

23. Means for inhibiting the formation of ice on upper and lower spot-welding electrodes having mutually opposing tips cooled below the freezing point of water, said means comprising:

an upper vessel having sidewalls coaxial with the upper electrode, a lower rim, and an upper end which is provided with an end wall closely and slidingly encircling the upper electrode;

a lower vessel having sidewalls coaxial with the lower electrode, an upper rim, and a lower end which is provided with an end wall closely and slidingly encircling the lower electrode;

the said vessels being movable toward each other into a position of engagement of their rims, whereby they form a compartment enclosing the tips of the electrodes, each of the vessels being movable to a position in which the tip of its associated electrode is exposed;

and means supplying a dry gas into the upper and lower vessels.

References Cited in the file of this patent
UNITED STATES PATENTS

| | | |
|---|---|---|
| 584,120 | Payne et al. | June 8, 1897 |
| 645,066 | Brown et al. | Mar. 13, 1900 |
| 1,206,890 | Murray et al. | Dec. 5, 1916 |
| 2,001,688 | Paugh | May 14, 1935 |
| 2,254,657 | Kennon | Sept. 2, 1941 |
| 2,281,335 | Somes | Apr. 28, 1942 |
| 2,392,736 | Hensel et al. | Jan. 8, 1946 |
| 2,416,374 | Brunberg | Feb. 25, 1947 |
| 2,502,876 | Mullen | Apr. 4, 1950 |
| 2,536,726 | Cornwall | Jan. 2, 1951 |